United States Patent [19]
Tanguay et al.

[11] Patent Number: 5,946,488
[45] Date of Patent: Aug. 31, 1999

[54] METHOD FOR SELECTIVELY AND INCREMENTALLY DISPLAYING THE RESULTS OF PREPROCESSING

[75] Inventors: David A. Tanguay, Kitchener; Peter J. Fraser, Waterloo Region, both of Canada

[73] Assignee: Thnkage Ltd., Ontario, Canada

[21] Appl. No.: 08/858,058

[22] Filed: May 16, 1997

[51] Int. Cl.[6] .................................................. G06F 9/45
[52] U.S. Cl. ........................................ 395/705; 395/704
[58] Field of Search ...................................... 395/705, 704

[56] References Cited

U.S. PATENT DOCUMENTS

| | | | |
|---|---|---|---|
| 4,553,205 | 11/1985 | Porchia | 395/703 |
| 5,513,305 | 4/1996 | Maghbouleh | 707/500 |
| 5,644,692 | 7/1997 | Eick | 345/326 |
| 5,701,489 | 12/1997 | Bates et al. | 395/705 |

OTHER PUBLICATIONS

Source Debug View Information Architecture, IBM Technical Disclosures Bulletin, pp. 307–310, vol. 36 No. 09B, 1993.

*Primary Examiner*—Tariq R. Hafiz
*Assistant Examiner*—Wei Zhen
*Attorney, Agent, or Firm*—Kent R. Richardson; Wilson, Sonsini, Goodrich & Rosati

[57] ABSTRACT

The present invention makes it possible for computer programmers to selectively examine the effects of preprocessing operations on computer source code. Where a preprocessor construct, such as a macro, appears in the source code, a user may selectively expand the construct to see the effects of expansion. If a macro expands into text which contains other macro calls, the user may selectively expand the other macro calls. The present invention allows the user to go back and forth between unexpanded, partly expanded, and fully expanded constructs in order to obtain a better understanding of the effect of macro expansion on the original source code. The present invention applies to any programming language which supports macros and/or other preprocessing constructs. It also applies to preprocessors that are independent of any programming language, such as the M4 preprocessor. The invention may also be included in another computer program, such as a debugger.

67 Claims, 4 Drawing Sheets

METHOD FOR SELECTIVELY AND INCREMENTALLY DISPLAYING THE RESULTS OF PREPROCESSING

BACKGROUND

1. Field of the Invention

The present invention relates to compilers, assemblers and preprocessors for computer programs, and more specifically to an apparatus and a method for selectively and incrementally viewing the results of preprocessing operations such as macro expansions.

2. Related Art

Computer programming languages such as C and macro assemblers provide facilities for preprocessing operations that prepare program source code for compilation or assembly. Preprocessing translates original source code into actual source code that can be compiled or assembled. For example, languages which support preprocessing typically allow programmers to define macros. A macro is an abbreviated notation for source code that is either too complicated to write out, hard to understand, used frequently, or subject to change. Before the source code is compiled, the preprocessing step translates the macro from its easy-to-read form into the actual source code specified by the macro definition.

Translating a macro into final source code is called macro expansion. After a macro has been expanded, a preprocessor may examine the result to see if it contains instances of other macros. If so, the preprocessor expands these embedded macros. This makes it possible to define macros in terms of other macros.

In a sense, macros are designed to hide distracting technical details, making it easier for a programmer to read source code. However, macros have drawbacks: when programmers are trying to debug a program, there is currently no easy way to see the code that results after macros have been expanded. Normal code editors only show the source code before preprocessing, not the expanded code after preprocessing. If, for example, a macro definition contains an error, it may produce bugs which are difficult to find, because the programmer has no good way to see the actual source code that the macro produces.

Some programming environments make it possible to view the code that results after preprocessing. However, this code may not be available in an easily readable form. Furthermore, this code is completely expanded; there is no provision for selectively viewing the expansion of specific macros or other preprocessor directives, while viewing the rest of the source code in its original form. Finally, current programming environments do not make it possible to examine intermediate phases of expansion. For example, if one macro definition makes use of another macro, there is no way for the programmer to view the code with one macro expanded but not the other.

What is needed is a method for selectively and incrementally viewing the results of the processing operations, including macro expansions.

SUMMARY

The present invention makes it possible for programmers to selectively and incrementally view the results of preprocessing operations such as macro expansion. The invention allows users to expand specific macros and other preprocessor directives, while continuing to view the rest of the source code in its original state. The present invention allows programmers to selectively switch back and forth from the original code to full or partial expansions of the code. This simplifies the process of debugging macros as well as the resulting compiled source code. Furthermore, the present invention is incremental; it lets a programmer see an expansion, then an expansion of the expansion, and so on, until the original code has been completely expanded. In contrast, current viewing facilities only provide "all or nothing;" the programmer can either see the original source code, or the completely expanded source code, not intermediate stages in between.

Thus, the present invention can be characterized as a method for selectively and incrementally viewing the results of preprocessing. The method operates by: (1) selecting portions of original code for display in preprocessed form; (2) preprocessing the original code to produce preprocessed code; and (3) displaying the selected portions of the original code in preprocessed form along with the rest of the original code.

The present invention can also be characterized as apparatus for selectively and incrementally viewing the results of preprocessing, comprising: (1) a computing system including a display; (2) resources for selecting portions of the original code for display in preprocessed form; (3) a preprocessor to the preprocess original code to produce preprocessed code; and (4) resources for displaying selected portions of the preprocessed code with portions of the original code.

One potential embodiment of the present invention is incorporated into software which serves as a code viewer and editor. Such software is often called an Integrated Development Environment (IDE). The code viewer displays source code on a user's monitor screen, with macros and macro expansions distinguished from other source code constructs by color, font characteristics, such as point size, italics, bold face and underlining, or some other attribute. The IDE lets the user choose how these constructs are visually distinguished. If the user clicks a mouse on an instance of a macro, the code viewer shows the expansion of the selected macro. When the expansion itself includes additional macros, the user can further click on these macros to expand them. In this way, the user can partly or fully expand any macro into the source code that results after preprocessing. This capability is useful in tracking down certain types of bugs and in interactively clarifying program behavior.

The present invention may be applied to other constructs besides macros. For example, programming languages which support preprocessing often allow source code in a first file to include source code from a second file. During the preprocessing step, the preprocessing software inserts code from the second file into the first file and processes the result as a single unit. In one embodiment of the present invention, a programmer can click on the directive that says "include code from file ABC" to see the source code obtained from file ABC. Other preprocessing constructs include conditional file inclusion and conditional inclusion of designated portions of the original code.

It is worthwhile noting how the present invention differs from facilities available in existing IDEs. In some existing IDEs, if a source code file X uses preprocessor facilities to include another file Y, the IDEs let the viewer "jump" from file X to file Y so that the viewer can examine the contents of file Y. In contrast, one embodiment of the present invention lets a viewer examine the included file Y "in place" within file X, with the following additional abilities: (1) any preprocessing constructs used within Y are interpreted within the environment already established for X. For example, suppose Y includes macros itself, or conditional compilation constructs that depend on definitions made in X. One embodiment of the present invention shows what will actually be obtained from Y after preprocessing, whereas conventional IDEs can only show the contents of Y before preprocessing; (2) in some languages, the file that gets included may depend on previous preprocessing constructs. For example, many implementations of C have preprocessing directives that affect how #include statements are interpreted. Therefore, an IDE may not be able to locate the correct file to include in a particular context until the source code is actually preprocessed. In this case, the present invention can identify and display the correct file because it performs the preprocessing in conjunction with displaying the source code.

While this description speaks in terms of programming languages, the present invention applies to any preprocessing software. For example, the M4 preprocessor is not specific to any particular programming language, but provides macro capabilities that can be used in any kind of text input. The present invention can be adapted for use with the M4 preprocessor as well. Similarly, the present invention can be applied to database products that support macro preprocessing for database queries. It can also be applied to specialized or customer preprocessors found in other types of software packages (for example, word processors which have macro capabilities).

The present invention can also be applied to macros which are used in other contexts besides preprocessing. For example, some languages support postprocessing constructs, which are essentially macros, and are also suitable for handling by the present invention.

DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
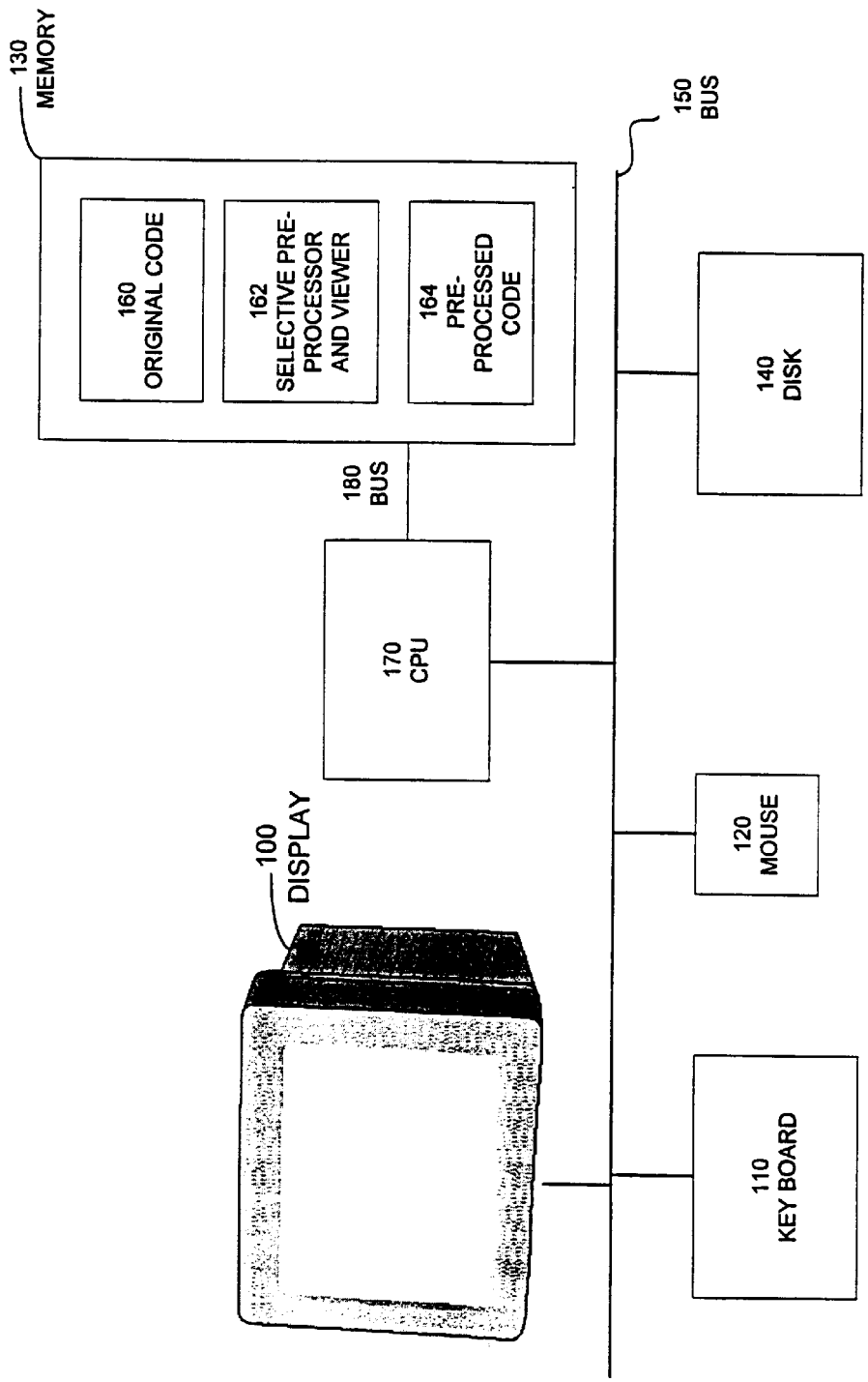
FIG. 1 is a block diagram illustrating a computer system including resources to selectively and incrementally display the results of preprocessing operations in accordance with an aspect of the present invention.

FIG. 1 is a block diagram illustrating a computer system including resources to selectively and incrementally display the results of preprocessing operations in accordance with an aspect of the present invention. FIG. 1 includes display 100, keyboard 110, mouse 120, disk 140 and CPU 170, which are connected together through bus 150, which is an I/O bus. CPU 170 additionally connects to memory 130 through bus 180, which is a faster processor to memory bus. Display 100 is a display device, such as a computer monitor, for displaying the results of preprocessing operations. Note that results of preprocessing operations may be additionally outputted to a printer, or even stored to a file for later viewing or printing. Keyboard 110 and mouse 120 are input devices for accepting user input into the computer system. Memory 130 and disk 140 are storage devices for storing programs and data involved in the preprocessing operations. CPU 170 is a central processing unit which: accepts user input from keyboard 110 and mouse 120; operates on programs and data stored within memory 130 and disk 140; and produces output for display 100.

Memory 130 contains original code 160, which is source code that has not been preprocessed. Memory 130 additionally contains selective preprocessor and viewer 162 as well as preprocessed code 164. Selective preprocessor and viewer 162 is a program which takes as input original code 160 and produces preprocessed code 164. Selective preprocessor and viewer additionally receives input from keyboard 110 and mouse 120, and generates output for display 100. This process of receiving input and generating output is used to facilitate the selective and incremental preprocessing operations.

Figure 2:
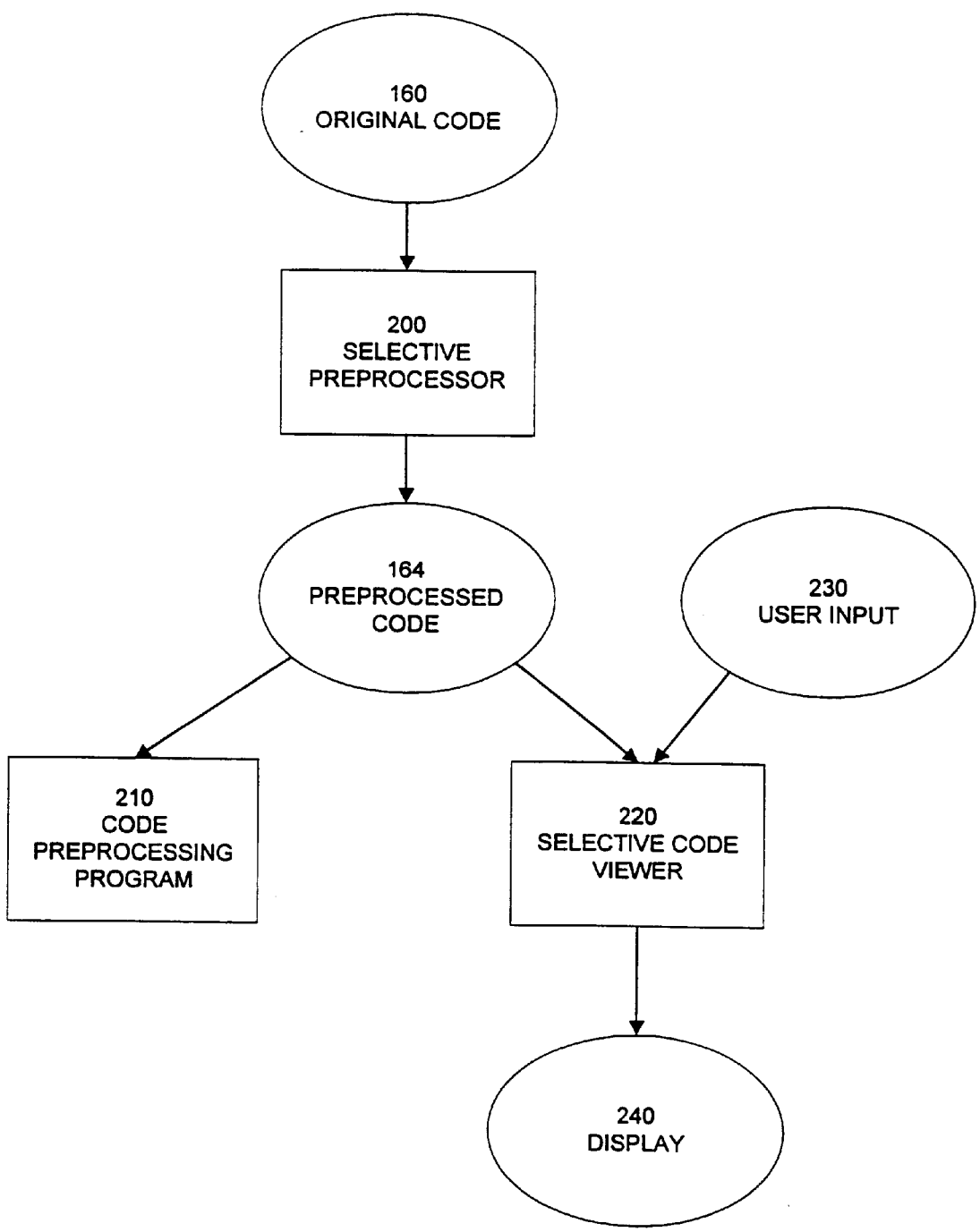
FIG. 2 is a flow diagram illustrating the operation of a system to selectively and incrementally display the results of preprocessing in accordance with an aspect of the present invention.

FIG. 2 is a flow diagram illustrating the operation of a system to selectively and incrementally display the results of preprocessing in accordance with an aspect of the present invention. The flow diagram starts with original code 160, which can be any type of code supported by the underlying preprocessor. Original code 160 passes through selective preprocessor 200, which is a modified version of a standard preprocessor. The output of selective preprocessor 200 is preprocessed code 164. In one embodiment of the present invention, the preprocessed code includes original code 160 along with annotations. In one variation of this embodiment, preprocessed code 164 takes the form of original code in expanded form with annotations giving the original code along with intermediate expansions. In another variation, the combined version includes original code 160 with annotations giving intermediate and final expansions to original code 160. Note that annotations may be a combination of original code and expansions.

Preprocessed code 164 feeds into code processing program 210 and/or selective code viewer 220. Selective code viewer 220 takes as inputs preprocessed code 164 and user input 230 and uses these two inputs to produce display 240. Selective code viewer 220 expands or contracts selected constructs in preprocessed code 164 in accordance with user input 230. Expandable and expanded constructs are marked in some easy to identify way so that the user knows which parts of the source code can be expanded or contracted. Alternatively, when preprocessed code 164 feeds into code processing program 210, code processing program 210 performs the same selection functions as are provided by user input 230. The selection functions performed by code processing program 210 may be the first step in some larger process (for example, compiling the code).

Figure 3:
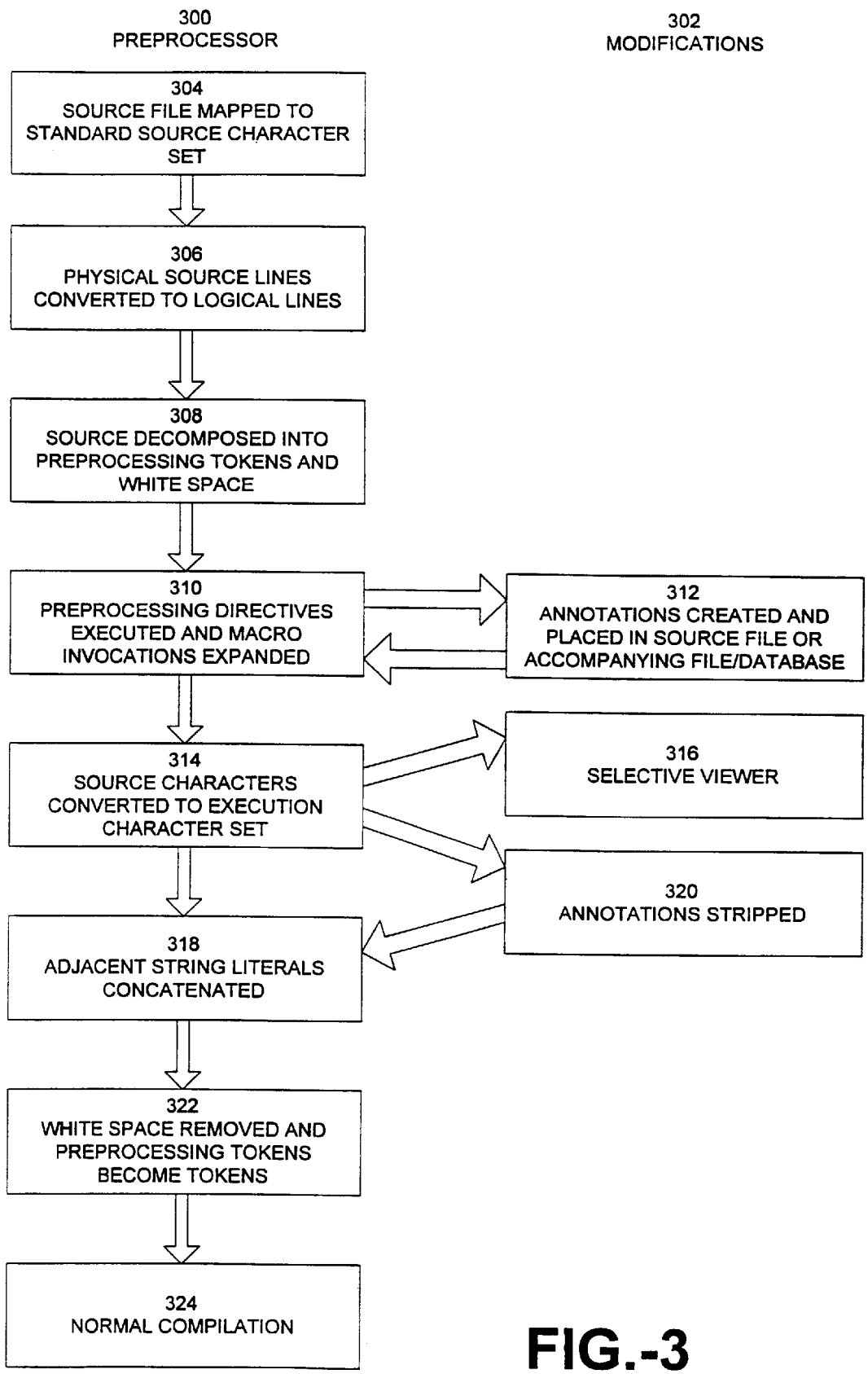
FIG. 3 is a detailed flow chart illustrating the steps involved in preprocessing in accordance with an aspect of the present invention.

FIG. 3 is a detailed flow chart illustrating the steps involved in preprocessing in accordance with an aspect of the present invention. The column on the left hand side of FIG. 3, labeled preprocessor 300, illustrates preprocessing operations included in a typical preprocessor for a high level programming language such as C++. The column on the right hand side of FIG. 3, labeled modifications 302, illustrates modifications to the operations in the column labeled preprocessor 300. Note that these modifications are inserted into the preprocessing steps at a point where macros and other preprocessing directives are expanded. As the original code is expanded, the preprocessor creates annotations recording information for later use in selective viewing.

The flow chart in FIG. 3 starts at state 304 in which an input source file, such as original code 160 in FIG. 1, is mapped to a standard source character set. The system next proceeds to step 306. At step 306, the physical source lines within the input source file are converted into logical lines. The system next proceeds to step 308. At step 308, the contents of the source file are decomposed into preprocessing tokens and white space. The system next proceeds to step 310. At step 310, preprocessing directives are executed and macro invocations are expanded. The system next proceeds to step 312. At step 312, annotations are created and are placed within the source file or in an accompanying file or a database. The system then returns to step 310. The system may repeatedly cycle between steps 310 and 312 until all of the proper annotations are created and expansions are performed. The system next proceeds to step 314. At step 314, source characters are converted to an execution character set. At this point, the system proceeds to step 316. At step 316, the selective viewer is invoked and the results of the preprocessing operations are selectively outputted to a display, such as display 100 in FIG. 1. The system then proceeds to step 320, if necessary, wherein annotations are stripped from the code. The system next proceeds to step 318. At step 318, adjacent string literals are concatenated. The system next proceeds to step 322. At step 322, white space is removed and preprocessing tokens become tokens. The system next proceeds to step 324. At step 324, normal compilation takes place.

The input to one embodiment of the present invention is source code from a programming language that supports preprocessing. For purposes of illustration, we use examples from the C programming language. However, the present invention may be applied to any type of preprocessing, not just the preprocessing supported by the C language.

Preprocessing Phase

One embodiment of the present invention first puts the input source code through an augmented preprocessor that performs all of the preprocessing specified by the language, and also includes the text of the preprocessing constructs present in the original source code. These preprocessing constructs are recorded as annotations within the expanded code.

For example, suppose a C program creates a macro such as:

define PI (3.14159)

The name of this macro is PI. When it is used in subsequent C source code, it will be expanded to (3.14159). Now suppose that the original source code contains circumference=2*PI*radius;

A normal C preprocessor translates this into circumference=2*(3.14159)*radius;

The macro is expanded by replacing the macro identifier with its associated definition. One embodiment of the present invention translates the original statement into circumference=2*/*S PI*/(3.14159)/*E PI*/* radius;

The constructs shown inside /* and */ are annotations resembling standard C comments. Such comments are ignored by the C compiler. The comment /*S PI*/ indicates the start of the expansion of the macro PI, and the comment /*E PI*/ indicates the end of the expansion of the macro PI.

As the above example shows, the output of the preprocessing phase of the present invention contains the normal results of preprocessing as prescribed by the programming language in addition to comments which specify the original source code before preprocessing. These comments are used in the following selective viewing phase of the invention.

The present invention is not tied to the use of comments, per se, as annotations. Comments are used as annotations in the above example to make the example easier to understand.

In general, the preprocessor of the present invention can use annotations of any kind, provided they record the text of the unexpanded and the expanded source code. The only requirement is that the preprocessor create some form of output that specifies the original text, the expanded text, and the correspondences between the two, including all intermediate expansions. The following are alternative embodiments of annotations which can be used: (1) instead of markers before and after expanded constructs, a single marker before an expanded construct including an indication that the expanded text extends for the next N characters; (2) the marker can come after the expanded text, rather than before; (3) the annotations can be placed in a separate file or a separate area of memory, along with sufficient information to determine which piece of expanded text is associated with which piece of original text; (4) the expanded file can take the form of the original text plus annotations giving the expanded text, rather than the expanded text with annotations giving the original text; (5) the text can be represented as a database or data structure, with original macros as nodes along with associated expansion trees; and (6) the annotations may not contain text per se, but rather instructions for reconstructing text. For example, annotations may specify changes relative to the original source file, so that expansions are obtained by applying changes from the annotations to the original source code. As another example, annotations may contain instructions for obtaining original code or processed code from another file that has been compressed, encrypted, or modified in some other way.

A macro expansion may be nested inside another macro expansion. For example, suppose a C programmer defines a macro as define AREA(r) (PI*(r)*(r))

(This macro calculates the area of a circle with radius r.) One embodiment of the present invention expands a statement such as:

a=AREA(6);

into a=/*S AREA(6)*/ (/*S PI*/(3.14159)/*E PI*/ *(6)*(6))
/*E AREA(6)*/;

The macro PI is nested within the macro AREA. Annotations need not be strictly nested depending upon how the preprocessing phase expands the original text. There may be situations in which annotations have a form such as:

/*S A*/ ... /*S B*/ ... /*E A*/ ... /*E B*/

Selective Viewing Phase

The input for the selective viewing phase of the present invention is the combined version of the source code and annotations produced by the preprocessing phase.

The selective viewing phase takes as input the combined version of the source code and displays it to the programmer. While doing this, the selective viewing phase uses the annotations in the expanded text to display the original source code. For example, if the process reads a=/*S AREA(6)*/(/*S PI*/(3.14159)/*E PI*/*(6)*(6))
/*E AREA(6)*/;
the selective viewing phase uses the annotations to reconstruct the original appearance of the source code. Hence, the selective viewing phase displays a=AREA(6);

A macro is typically distinguished visually for the programmer, for example by displaying it in a different color from other source code, to indicate that it is a macro.

The selective viewing phase of the present invention allows the programmer to expand macros where they are displayed. For example, if the programmer asks to expand the macro AREA in the above statement, the selective viewing phase displays a=(PI*(6)*(6));

The selective viewing phase can display this expansion because the combined version of the source code contains the necessary information. Notice that the above statement also contains a use of the macro PI. The programmer may ask to expand this macro as well, leading to the final code a=((3.14159)*(6)*(6));

This code contains no additional preprocessing constructs, so the viewing phase cannot expand it further.

Just as the selective viewing phase can expand preprocessing constructs, it can also reverse the process. In the previous example, the programmer may "contract" the final expansion back to a=(PI*(6)*(6));

or to a=AREA(6);

A similar process can be used for expanding or contracting any kind of preprocessing directive. For example, if the programmer wants to expand the "include" directive, the selective viewing phase can do so because the combined version of the source code contains the complete text of the included file. Hence, the selective viewing phase can display the included file for the user to examine.

The present invention may include a variety of different user interfaces. As noted previously, one embodiment of the selective viewing phase distinguishes macros and macro expansions visually. However, this is not a substantive part of the invention; indeed, a program which implements the invention can offer a variety of options for making these constructs easier to identify, including using different colors and different fonts. These are only cosmetic factors in displaying the results of the invention. Similarly, as mentioned above, in one embodiment the user can "click" on a particular macro with a mouse in order to see the expanded version of the macro. However, a program which implements the invention can offer the user a variety of techniques for expanding or contracting macros and preprocessing directives. For example, the program might have a command that says, "expand all macros" or "contract all include files." As another example, all preprocessing constructs might be labeled with numbers, and the program might allow the user to specify "Expand macro 4."

Finally, it should be noted that the viewing phase of one embodiment of the present invention is controlled by a program rather than a live user. For example, in one embodiment a debugging facility allows users to walk through program execution one instruction at a time. When the debugger reaches a statement containing a preprocessing construct, the debugger automatically expands the construct. The expansion is not directly specified by a live user, but the debugger uses the basic steps of the invention to display the expansions in full or partial form according to a practical criterion.

In one embodiment of the present invention, the preprocessed code that results from the preprocessing phase can be sent to any of three destinations: (1) the code can be sent to the selective viewing phase of the present invention; (2) the code can be sent to a "stripper" program which strips out the annotations. Once the stripper has done its work, the code can be sent to a normal compiler for compilation; and (3) the code can be sent directly to a compiler. In this case, the compiler has to strip out the annotations itself as it reads the processed code.

In one embodiment, the present invention is implemented in a program that is separate from a compiler. In another embodiment, it is incorporated into a compiler. If the preprocessor/viewer is separate from the compiler, a simple stripper program is used to strip out the annotations to produce code that can be compiled. If the preprocessor/viewer is incorporated into the compiler, the compiler simply skips over the annotations as it compiles the preprocessed code.

Positioning Within Compilation Process

One embodiment of the present invention takes original source code, expands it with annotations, and allows the user to view the code selectively. After the user has viewed the code, the embodiment returns the code either to its original form or its expanded form.

Consequently, the present invention may be positioned at various points in the compilation process. For example, one embodiment applies the present invention before the source code is processed and compiled. Later on, when the programmer wants to compile code, the annotations are examined and stripped out, leaving original source code for the compiler to compile from scratch including a normal preprocessing step. Another embodiment of the present invention examines the annotations and strips them out to produce preprocessed code, thereby eliminating the preprocessing step from the compilation process.

We should also note that the two above-mentioned phases of present invention need not be carried out separately. Conceptually, it is easier to visualize present invention as a preprocessing phase followed by a selective viewing phase. However, the invention could also be implemented with the two phases taking place in parallel: the preprocessing phase would start first, and the viewing phase would begin as soon as there was something that could be displayed to the user. For that matter, the viewing phase could begin first, simply by displaying the original input. Meanwhile, the preprocessing would take place as a parallel background task. By the time a user asks to expand a particular macro, the background preprocessing may have already produced the information necessary to show the desired expansion. If not, the user is asked to wait until the preprocessing phase finishes with the desired macro.

EXAMPLE

The present invention can be incorporated it into a C compiler in the following way. The technique uses one piece of software called the preprocessor and one called the viewer. These will be discussed as if they were separate pieces of software, although they could be combined into a single program (for example, a complete C compiler).

As the preprocessor reads the source code, it associates a unique identifier number with each new token found in the code. For example, each time the preprocessor encounters a new variable name, the preprocessor assigns a number to that name. Similarly, the preprocessor associates identifier numbers with keywords, expression operators, and other syntactic elements.

For example, consider the statement:

a=2;

This statement would be represented by an identifier number for the variable "a," an identifier number for the operator "=," an identifier number for the constant "2," and an identifier number for the delimiter";."

As the preprocessor reads input, it creates a String Table: an in-memory database that records which token is associated with which identifier number. For example, this table states that a particular identifier number stands for the variable "a," and a different identifier number stands for the constant "2."

When the preprocessor finishes, the entire input has been converted into a sequence of identifier numbers (the Input Representation), plus the String Table telling which number corresponds to which original input string. This approach saves memory space. Long tokens (such as long variable names) only need to be recorded once, in the String Table. Whenever a token is actually used, the preprocessor just records its identifier number (which is almost always significantly shorter than the original string).

This approach also speeds up later steps in the compilation process, since the later processing steps can work more quickly with identifier numbers than with strings for names. For example, later stages of compilation have no need to perform symbol-table lookups, since the symbols have already been reduced to numeric identifiers.

One embodiment of the present invention can be incorporated into a compiler by creating three new operators for use in the Input Representation: (1) an operator to indicate the beginning of an original source construct; (2) an operator to indicate the end of an original source construct and the beginning of a macro expansion; and (3) an operator to indicate the end of the expansion.

We can depict this arrangement as:

[original|expansion]

(where the symbols "[|]" are just convenient characters to depict the operators involved; they are not the delimiters that are actually used). The original code and the expansion are both represented by a sequence of identifier numbers, as opposed to actual text. The identifier numbers refer to tokens that are listed in the String Table. Hence, the annotations do not give either the original text or the expansion; they merely provide sufficient information to reconstruct the original text and/or the expansion as required.

We should note that the "]" that closes a sequence has an associated label to identify which "[" is associated with it. It may be useful to label all three delimiters "[|]" to simplify the task of identifying which are associated with which; however, this would just be a matter of convenience. The only truly necessary marker is a label (or some other form of identification) on the "]" indicating its corresponding "[."

When the viewer software reads the Input Representation, it can reconstruct either the original code or the expansion from the information provided. This makes it possible to proceed with the selective viewing phase. On the other hand, if the Input Representation is sent on for actual compilation, the next pass of the compiler simply strips out the original code, leaving only the expanded code to be compiled.

The String Table and the Input Representation may be viewed as a way to compress the annotated and preprocessed source code so that they require less space in memory and on disk. This approach is comparable to many well-known compression techniques (for example, the Lempel-Ziv technique), in that long strings are represented by single integers, plus a table telling how to convert the integers back into the original strings.

One important aspect of the preprocessor's compression technique is how it handles the conditional inclusion of code. In C, preprocessing constructs like #if and #ifdef make it possible for the preprocessor to skip blocks of code under specified conditions. For example, these constructs are often used in source code files that are intended to be included through the #include preprocessing construct. (Such source code files are commonly called "include files".) It is not uncommon for the same file to be included several times by #include directives used in different places throughout the original source code. To avoid processing the same code several times, the include file might take the following form:

```
#if !defined(__PROCESSED_THE_FILE_ALREADY__)
#define __PROCESSED_THE_FILE_ALREADY__ 1
        /*Main contents of the file here*/
#endif
```

The #if directive tests to see if there is already a macro named __PROCESSED_THE_FILE_ALREADY__. If there is not, the preprocessing phase defines such a macro and then moves on to process the main contents of the file.

If this file is included again later in processing, the preprocessor encounters the #if directive again. This time, there is a macro of the given name (defined the first time through the file), so the preprocessor ignores everything down to the #endif directive. In this way, the preprocessor only processes the main contents of the file once; whenever the preprocessor encounters the file again, it skips the main contents of the file, thereby avoiding the unnecessary task of processing everything again. The effect is that the contents of the file are only processed once. This may be more than a mere efficiency—sometimes the contents of an include file are such that processing them more than once would result in program errors.

This kind of preprocessing is called conditional inclusion. C programmers often use it to avoid processing the same file more than once. Therefore, it is important for the present invention to handle the situation efficiently. The preprocessor of our invention can do this by treating skipped code as a single string. This means that whenever the preprocessor skips a section of code because of conditional inclusion, the skipped section is not processed in any way. It is simply recorded in the String Table as an unprocessed string of characters. Because the skipped section is recorded, it can still be displayed if the user wishes to see it. However, there is no need to waste time or memory space dealing with the string in any other way.

Treating a skipped section in this way is an optimization for the sake of performance, particularly for the memory requirements of the viewer. If necessary, the preprocessor could still represent the skipped section like normal code, broken into separate tokens. However, that would substantially increase the amount of computer memory and/or disk space required to handle a normal-sized program. By treating skipped sections as single strings, we keep memory requirements down to a level that does not burden an average-sized computer system.

Note that additional inclusions of the same skipped section take up very little memory or disk space in the Input Representation. The skipped section is treated as an unprocessed string and therefore, the entire section is associated with a single identifier number. If the section appears again in the code (for example, because the same include file is included again), the Input Representation can just represent the repeated section with its identifier number rather than containing another copy of the section itself.

Figure 4:
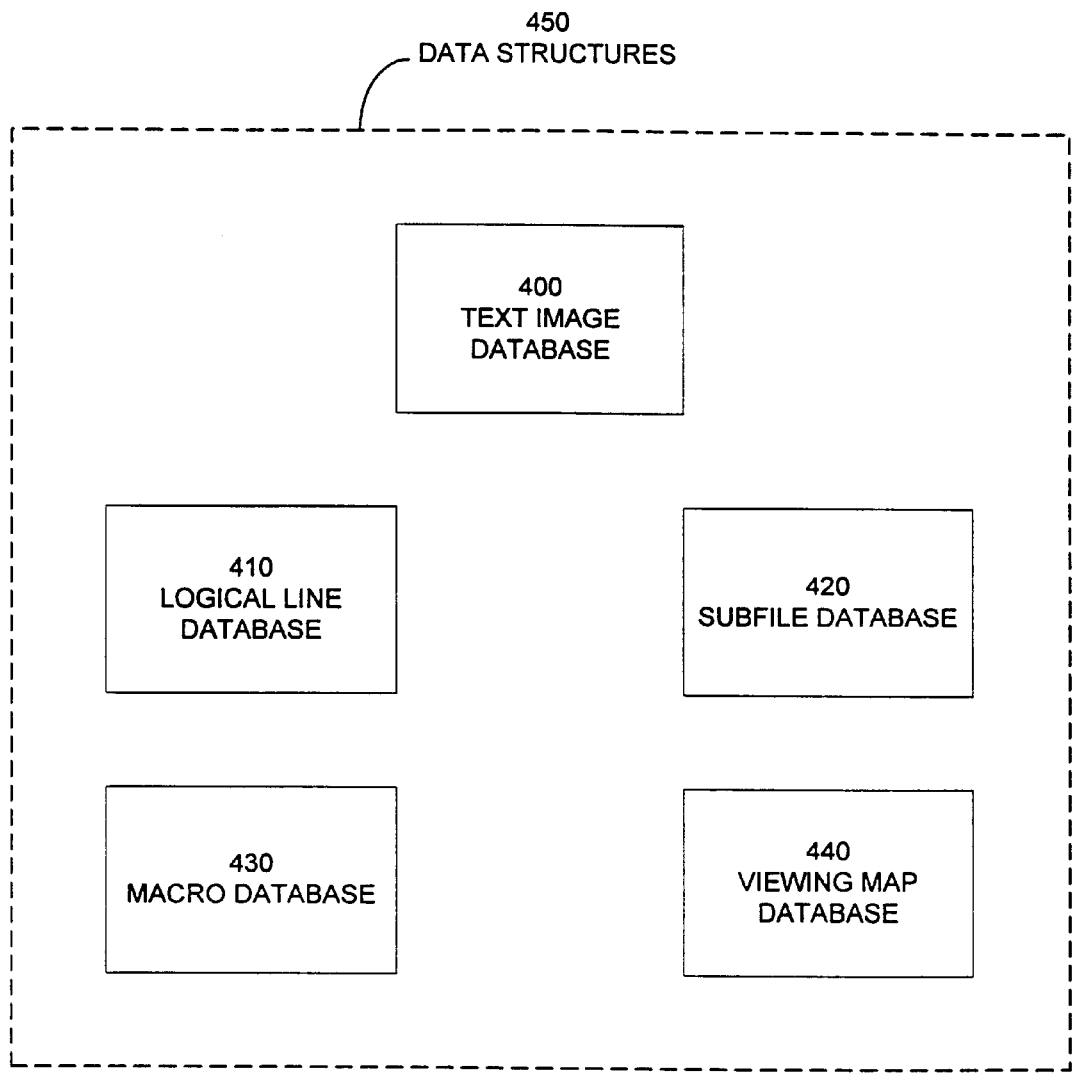
FIG. 4 is a block diagram illustrating some of the major data structures involved in the process of selectively and incrementally displaying the results of preprocessing in accordance with an aspect of the present invention.

FIG. 4 is a block diagram illustrating some of the major data structures involved in the process of selectively and incrementally displaying the results of preprocessing in accordance with an aspect of the present invention. The data structures include: text image database 400, logical line database 410, subfile database 420, macro database 430 and viewing map database 440.

Text image database 400 includes the original source text, all the partial expansion annotations, and a few statistics on the contents.

Logical line database 410 contains a record for each logical line of the processed source. A logical line may span many physical lines of the original input, but may be considered a single entity for preprocessing purposes. All preprocessing operations and annotations operate within a single logical line (although #include directives associate a group of logical lines with a single original line). Each record specifies: the containing subfile record, the physical line(s) that constitute the logical line, the source file and line number of the start of the logical line, the number of physical lines that constitute the logical line, and the region of the macro database containing macro instances on this logical line. Each record contains other information, derived from the preceding, to simplify and speed up the viewing phase.

Subfile database 420 contains a record for each "subfile" or the original source. A subfile includes the original source file as well as each instance of an included file; this means that every successful #include directive creates a new subfile. Each record specifies the including subfile, the logical line initiating the inclusion of this subfile, and the range of logical lines that constitute the subfile. Each record contains other information, derived from the preceding, to simplify and speed up the viewing phase.

Macro database 430 contains a record for each instance of a macro expansion. Each record also contains a reference to the containing logical line record and a reference to any containing macro (if this macro occurs as part of another macro's expansion text). The reference to the containing macro is necessary to resolve the ambiguity when a user clicks on a macro that appears in the expansion of another macro. Typically, clicking on a macro means that you want to expand that macro, while clicking on the expansion of a macro means that you want to go back to see the original code. When the user clicks on a macro XYZ that appears in the expansion of macro ABC, the viewing phase must decide whether to expand XYZ or go back to the original source code of ABC.

A similar ambiguity occurs when the macros have been fully expanded. For example, suppose the user clicks on the expansion of XYZ within the expansion of ABC. The viewer must decide whether to reverse the expansion of just XYZ or of the containing expansion of ABC. In order to resolve such questions, the macro database must record that XYZ is contained in the expansion of ABC.

Each record in the macro database also contains other information, derived from the information listed above, to simplify and speed up the viewing phase.

Viewing map database 440 contains records for mapping regions of the display to actions. The actions include expanding and contracting macros, and entering and exiting subfiles. The mappings help determine which viewing changes apply to which displayed text. For example, a map might specify a rectangle which includes text containing an unexpanded macro. A mouse click on that rectangle can then be recognized as a request to perform some action on the macro, such as expanding it.

The foregoing description of embodiments of the present invention have been presented for purposes of illustration and description only. They are not intended to be exhaustive or to limit the invention to the forms disclosed. Many modifications and variations will be apparent to practitioners skilled in the art.

What is claimed is:

1. In a computer system, including original code, a method for selectively viewing the results of preprocessing, comprising:

selecting selected portions of the original code for display in preprocessed form;

preprocessing the original code to produce preprocessed code by substituting the text of preprocessing constructs within the original code with corresponding expanded text in the preprocessed code; and sending to an output device the selected portions of the original code in preprocessed form as well as corresponding portions of the original code.

2. The method of claim 1, wherein the step of preprocessing performs macro expansion.

3. The method of claim 1, wherein the step of preprocessing performs file inclusion.

4. The method of claim 1, wherein the step of preprocessing performs conditional inclusion of designated portions of the original code.

5. The method of claim 1, wherein:

the preprocessing step incrementally preprocesses the original code by expanding preprocessing constructs within the original code to produce expanded code in which nested preprocessing constructs within the expanded code are not expanded to their fullest extent.

6. The method of claim 5, further including:

selecting a selected portion of the expanded code for further incremental preprocessing; and preprocessing the selected portion of the expanded code by expanding preprocessing constructs in the selected portion of the expanded code to produce further expanded code so that nested preprocessing constructs within the further expanded code are expanded to their fullest extent.

7. The method of claim 1, including:

selecting selected portions of the preprocessed code for display to the output device in original code form; and sending to the output device the selected portions of the preprocessed code in original code form.

8. The method of claim 1, wherein the step of selecting selected portions of the original code for display in preprocessed form is performed by a human through a user interface.

9. The method of claim 1, wherein the step of selecting selected portions of the original code for display in preprocessed form is performed by a human through a user interface by inputting an explicit command in the form of a character string to select a portion of the original code.

10. The method of claim 1, wherein the step of selecting selected portions of the original code for display in preprocessed form is performed by computer program.

11. The method of claim 1, wherein the step of selecting selected portions of the original code for display in preprocessed form is performed by a debugger.

12. The method of claim 1, wherein:

the step of preprocessing preprocesses all of an original code module to produce a preprocessed code module; and the step of sending to an output device selected portions of the preprocessed code with portions of the original code sends portions of the preprocessed code module together with portions of the original code module.

13. The method of claim 1, wherein the step of preprocessing preprocesses selected portions of an original code module.

14. The method of claim 1, wherein the original code includes a plurality of original code files.

15. The method of claim 1, wherein the step of preprocessing takes place before the step of selecting.

16. The method of claim 1, wherein the step of preprocessing takes place in parallel with the step of sending to an output device.

17. The method of claim 1, wherein: the original code includes a database query; and the step of preprocessing includes preprocessing the database query.

18. The method of claim 1, wherein the step of preprocessing includes embedding a set of annotations into the preprocessed code.

19. The method of claim 1, wherein the step of preprocessing includes embedding a set of annotations into the preprocessed code, the set of annotations including a first marker before a portion of the preprocessed code and a second marker after the portion of the preprocessed code.

20. The method of claim 1, wherein the step of preprocessing includes embedding a set of annotations into the preprocessed code, the set of annotations including a first marker before a portion of preprocessed code, and an indication of the length of the portion of preprocessed code.

21. The method of claim 1, wherein the step of preprocessing creates a data structure representing a macro as a node and representing an associated macro expansion as an expansion tree linked to the node.

22. The method of claim 21, wherein when a node represents a macro that occurs in an expansion of a containing macro, there are links in both directions, linking the macro and the containing macro.

23. The method of claim 1, wherein the step of preprocessing includes embedding a set of annotations into the preprocessed code, the set of annotations including instructions on how to modify portions of the original code to obtain corresponding portions of final and intermediate versions of the preprocessed code.

24. The method of claim 1, wherein the step of preprocessing includes creating a set of annotations, the set of annotations including references to portions of original code and references to portions of preprocessed code.

25. The method of claim 1, wherein the step of preprocessing includes producing a set of annotations separate from the preprocessed code, the set of annotations including information linking portions of original code with corresponding portions of preprocessed code.

26. The method of claim 1, wherein:
the step of preprocessing includes embedding a set of annotations into the preprocessed code; and including
stripping out the annotations from the preprocessed code; and
compiling the preprocessed code.

27. The method of claim 1, wherein the step of preprocessing includes embedding a set of annotations into the original code.

28. The method of claim 1, wherein the step of preprocessing includes compressing the preprocessed code.

29. The method of claim 1, wherein the step of sending to an output device sends a selected portion of the preprocessed code along with a corresponding portion of the original code from which the portion of the preprocessed code was derived.

30. The method of claim 1, wherein in the step of sending to an output device, the preprocessed code is distinguished from the original code by color.

31. The method of claim 1, wherein in the step of sending to an output device, the preprocessed code is distinguished from the original code by font characteristics.

32. The method of claim 1, wherein in the step of sending to an output device, the preprocessed code is distinguished from the original code by a visual marking.

33. The method of claim 1, including the step of compiling the preprocessed code.

34. In a computer system, including original code, a method for selectively viewing the results of preprocessing, comprising:
selecting selected portions of the original code for display in preprocessed form;
preprocessing the original code to produce preprocessed code, wherein the preprocessing,
includes macro expansion, file inclusion and conditional inclusion of designated portions of the original code,
expands preprocessing constructs within the original code to produce expanded code in which preprocessing constructs within the expanded code are not expanded to their fullest extent, and
creates a set of annotations relating portions of the original code with corresponding portions of the preprocessed code; and
sending to an output device the selected portions of the original code in preprocessed form as well as corresponding portions of the original code.

35. An apparatus for selectively viewing the results of preprocessing, comprising:
a computing system including an output device;
resources that select selected portions of the original code for display in preprocessed form;
a preprocessor to preprocess original code to produce preprocessed code by substituting the text of preprocessing constructs within the original code with corresponding expanded text in the preprocessed code; and
resources that send to the output device selected portions of the preprocessed code with portions of the original code.

36. The apparatus of claim 35, wherein the preprocessor includes resources that perform macro expansion.

37. The apparatus of claim 35, wherein the preprocessor includes resources that perform file inclusion.

38. The apparatus of claim 35, wherein the preprocessor includes resources that perform conditional inclusion of designated portions of the original code.

39. The apparatus of claim 35, wherein the preprocessor includes resources that incrementally preprocess the original code by expanding preprocessing constructs within the original code to produce expanded code so that preprocessing constructs within the expanded code are not expanded to their fullest extent.

40. The apparatus of claim 39, further including resources that select a selected portion of the expanded code for further preprocessing; and
resources that preprocess the selected portion of the expanded code by expanding preprocessing constructs in the selected portion of the expanded code to produce further expanded code so that nested preprocessing constructs within the further expanded code are expanded to their fullest extent.

41. The apparatus of claim 35, including:
resources that select a selected portion of the preprocessed code for display to the output device in original form; and
resources that send to the output device the selected portion of the preprocessed code in original form.

42. The apparatus of claim 35, wherein the resources that select selected portions of original code include a user interface which includes resources that accept selections from a human user.

43. The apparatus of claim 35, wherein the resources that select selected portions of the original code include a user interface which includes resources that accept a selection from a human user in the form of a character string.

44. The apparatus of claim 35, wherein the resources that select selected portions of the original code includes resources that accept selections from a computer program.

45. The apparatus of claim 35, wherein the resources that select selected portions of the original code includes resources that accept selections from a debugger.

46. The apparatus of claim 35, wherein:
the preprocessor includes resources that preprocess all of an original code module to produce a preprocessed code module; and
the resources that send to the output device selected portions of the preprocessed code with portions of the original code display portions of the preprocessed code module together with portions of the original code module.

47. The apparatus of claim 35, wherein the preprocessor includes resources that preprocess selected portions of an original code module.

48. The apparatus of claim 35, wherein the original code includes a plurality of original code files.

49. The apparatus of claim 35, wherein the preprocessor includes resources that perform the preprocessing before the resources that select perform the selecting.

50. The apparatus of claim 35, wherein preprocessor includes resources that perform the preprocessing in parallel with the resources that perform the sending to the output device.

51. The apparatus of claim 35, wherein the preprocessor includes resources that preprocess a database query.

52. The apparatus of claim 35, wherein preprocessor includes resources that embed a set of annotations into the preprocessed code.

53. The apparatus of claim 35, wherein preprocessor includes resources that embed a set of annotations into the preprocessed code, the set of annotations including a first marker before and a second marker after a portion of preprocessed code.

54. The apparatus of claim 35, wherein the preprocessor includes resources that embed a set of annotations into the preprocessed code, the set of annotations including a first marker before a portion of preprocessed code, and an indication of the length of the portion of preprocessed code.

55. The apparatus of claim 35, wherein the preprocessor includes resources that create a data structure representing a macro as a node and representing an associated macro expansion as an expansion tree linked to the node.

56. The method of claim 55, wherein when a node represents a macro that occurs in an expansion of a containing macro, there are links in both directions, linking the macro and the containing macro.

57. The apparatus of claim 35, wherein the preprocessor includes resources that embed a set of annotations into the preprocessed code, the set of annotations including instructions on how to modify portions of the original code to obtain corresponding portions of final and intermediate versions of the preprocessed code.

58. The apparatus of claim 35, wherein the preprocessor includes resources that create a set of annotations, the set of annotations including references to portions of original code and references to portions of preprocessed code.

59. The apparatus of claim 35, wherein the preprocessor includes resources that produce a set of annotations separate from the preprocessed code, the set of annotations including information linking portions of the original code with corresponding portions of the preprocessed code.

60. The apparatus of claim 35, wherein the preprocessor includes resources that embed a set of annotations into the preprocessed code, and including:
resources that strip out the annotations from the preprocessed code; and
resources that compile the preprocessed code.

61. The apparatus of claim 35, wherein the preprocessor includes resources that embed a set of annotations into the original code.

62. The apparatus of claim 35, wherein the preprocessor includes resources to compress the preprocessed code.

63. The apparatus of claim 35, wherein the resources that send to the output device include resources that send selected portions of preprocessed code along with corresponding portions of the original code from which the preprocessed code was derived.

64. The apparatus of claim 35, wherein in the resources send to the output device include resources that distinguish the preprocessed code from the original code by color.

65. The apparatus of claim 35, wherein in the resources that send to the output device include resources that distinguish the preprocessed from the original code by font characteristics.

66. The apparatus of claim 35, wherein in the resources that send to the output device include resources that distinguish the preprocessed code from the original code by a visual marking.

67. The apparatus of claim 35, including resources that compile the preprocessed code.

* * * * *

UNITED STATES PATENT AND TRADEMARK OFFICE
CERTIFICATE OF CORRECTION

PATENT NO. : 5,946,488
DATED : August 31, 1999
INVENTOR(S) : Tanguay et al.

It is certified that error appears in the above-identified patent and that said Letters Patent is hereby corrected as shown below:

Cover Page block [73] change "Thnkage Ltd" to --Thinkage Ltd.--

Signed and Sealed this

Twelfth Day of June, 2001

*Attest:*

NICHOLAS P. GODICI
*Attesting Officer*    Acting Director of the United States Patent and Trademark Office